United States Patent [19]

Smartt et al.

[11] 4,191,563
[45] Mar. 4, 1980

[54] CONTINUOUS STREAM TREATMENT OF DUCTILE IRON

[75] Inventors: Herschel B. Smartt; Bela V. Kovacs, both of Dearborn Heights, Mich.

[73] Assignee: Ford Motor Company, Dearborn, Mich.

[21] Appl. No.: 665,019

[22] Filed: Mar. 8, 1976

[51] Int. Cl.² .............................................. C22C 33/08
[52] U.S. Cl. ..................................... 75/130 R; 75/53; 75/130 B
[58] Field of Search ............. 75/53, 130 R, 129, 93 R, 75/130 A, 130 B

[56] References Cited
U.S. PATENT DOCUMENTS

| 3,272,619 | 9/1966 | Sweeney | 75/68 R |
| 4,034,970 | 7/1977 | Akeel | 75/130 B |

Primary Examiner—P. D. Rosenberg
Attorney, Agent, or Firm—J. W. Malleck; Olin B. Johnson

[57] ABSTRACT

A method and apparatus for continuously stream treating molten metal is disclosed. A controlled vortex flow of the molten metal is stimulated and a stream of particulate treating agent, such as magnesium ferrosilicon, or pure magnesium mixed with other ferro alloys, is directed onto a predetermined zone of the vortical flow. A stream choke is employed downstream of the vortex flow to control dwell time of the flow in the vortex and to regulate downstream mixing. This method increases magnesium recovery, provides flexibility to change charge weights, eliminates residue in treating apparatus, and promotes dissolution of the treating agent within a desired zone.

4 Claims, 2 Drawing Figures

CONTINUOUS STREAM TREATMENT OF DUCTILE IRON

BACKGROUND OF THE INVENTION

Two recent techniques are now deemed major developments in the field of producing nodular cast iron, namely; mold-modulizing and continuous stream treatment. Each of these treatments or processes can be used for purposes of treating molten metal to achieve a variety of different metallurgical changes.

This invention is particularly concerned with continuous stream treatment wherein a reaction takes place in a closed launder situated in the metal flow either between the furnace and a pouring ladle or between the ladle and the mold. In contrast, the mold nodulizing process enables nodulizing to take place within the mold by incorporating a specially designed gating system. However, mold nodulization is limited in capacity and is not particularly suitable to optimum production when dealing with pouring tonnages exceeding 1500 lbs. (maximum poured weight). For a more complete explanation of the state of the art with respect to stream treatment, reference is made to U.S. patent application Ser. No. 569,029, filed 4-17-75, commonly assigned to the assignee hereof; the disclosure of said patent application is incorporated herein by reference.

In spite of the fact that continuous stream treatment is more suitable to larger poured weights, there remains certain limitations which must be overcome, such as (a) greater reliability of treatment so that there is a uniformly high degree of nodularization throughout the entire casting, (b) the existence of dirty treating chambers having a residue resulting from practising the process sequence, (c) relatively low nodulizing agent recovery, (d) the need for a more controllable treatment process to allow for use of different casting weights without alteration of the process, (e) excess maintenance of process equipment, and (f) the need for expensive multiple core type launders or treating devices. The lack of proper homogenization may, in part, be due to inadequate mixing of the treating agent with the molten metal in a properly sequestered manner so that a greater volume of the treatable metal is contacted by such agent within a relatively short treating period. Thus, the character of the flow of the treatable metal and treating agent become of importance, as well as the character of the particle of the treating which is to be immersed in such treatable metal.

SUMMARY OF THE INVENTION

A primary object of this invention is to provide an improved method of treating molten metal with a highly reactive treating agent in a manner to insure a high degree of uniform dissolution of the treating agent into said treatable metal.

Another object of this invention is to provide an improved process for nodulizing molten cast iron, said method being carried out by use of a continuous stream treating device which insures self-cleaning of such treating device, eliminates entrapment of dross and slag within the casting, enables the treating device to be recharged immediately after each treatment, enables a reasonable range of treatable metal weights to be employed, and insures uniform nodulizing alloy solution entirely within the continuous treating system.

Yet still another object of this invention is to provide a continuous stream treatment device and a method of operating same for use when nodulizing molten cast iron without pretreatment, the device being particularly economical in construction and requires a minimum of maintenance.

Yet still another object of this invention is to provide a method for treating molten iron with highly reactive treating agents which obtains an optimum solution rate of nodulization and optimum recovery of the treating agent by in part controlling the exposed surface area of the nodulizing agent particle; excessively large particles, such as lumps, tend to float in the processing or treating chamber, thus not exposing the entire particle surface to the metal and thereby provides uncontrolled solution and greater dross. A granular alloy or a particularly fine powder will not float and therefore, while in the powder charge, the entire surface will be presented to the molten metal affording a degree of solution control.

DETAILED DESCRIPTION

Figure 1:
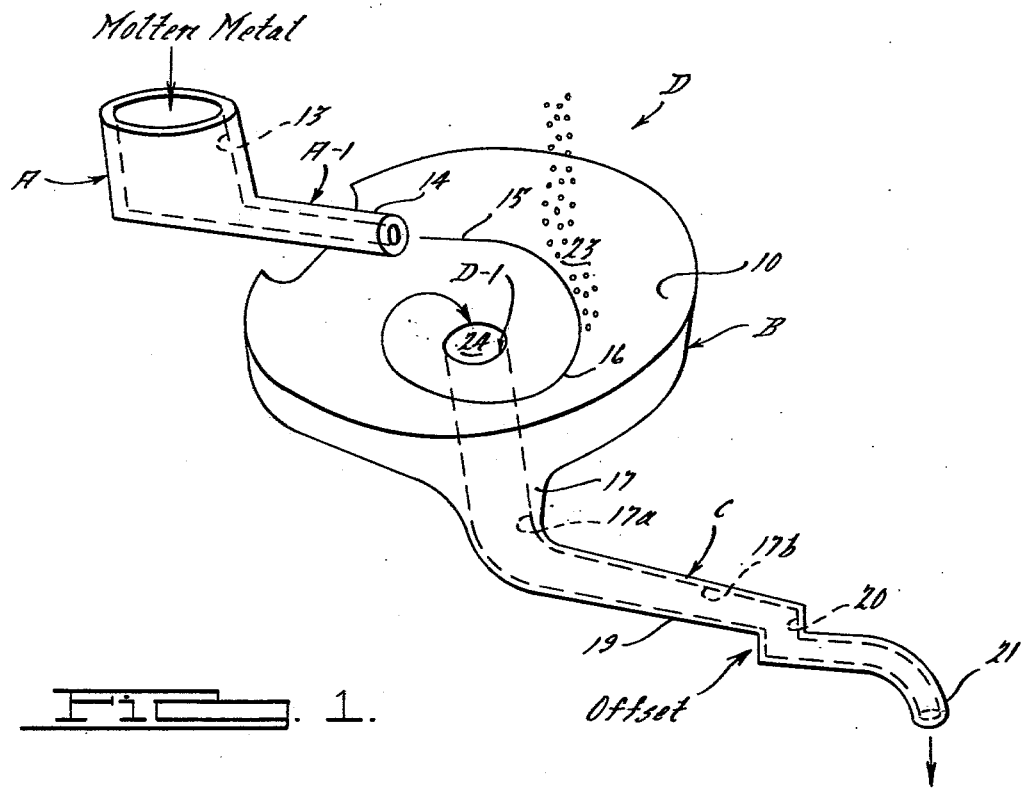
FIG. 1 is a schematic perspective illustration of the process sequence and apparatus of this invention.

According to this present invention, it is now possible to overcome substantially all of the problems delineated earlier and at the same time reduce the cost of processing. This has been achieved primarily by continuously adding the nodulizing agent to a treating device which employs one or more elements effective to create a vortical flow of molten treatable metal. Turning to FIG. 1, these elements consist essentially of a pouring cup A having a stream or jet forming conduit A-1, a closed vortex generating bowl B with an outlet opening B-1 at the base thereof, and a mixing conduit C fluidly connected to the outlet opening of B-1 of the bowl. The bowl C is shaped to have an interior surface 10 which is in the form of a funnel or cone having integrated portions 10a and 10b; the uppermost portion 10a of the conical surface makes an angle with a vertical line of about 5°. The lowermost portion 10b makes an angle with a vertical line of about 70°. The upper periphery 11 of the bowl is closed by a cover 12 so that the reaction between the molten metal and treating agent continues progressively out of contact of atmospheric air, hence volatilization and oxidation is substantially, if not totally eliminated during processing. It is possible that in some applications, an inert gas may be directed into the interior volume of the bowl to further protect the reaction process.

The pouring cup is constituted of a receiving chamber 13 effective to contain a body of molten metal to feed and force molten metal through the stream forming conduit A-1, the conduit being in fluid communication with the bottom of the chamber 13. The interior diameter of conduit is sized to generate a jet or stream, eminating from the end or nozzle 14, which extends somewhat horizontally for a predetermined distance, such as 3 inches. The conduit is arranged to extend through the side of bowl B at the upper region thereof and is effective to direct the stream 15 of molten metal substantially tangent to the interior upper surface 10a of said bowl. The molten metal is caused to follow around the interior surfaces 10a and 10b to form a vortical flow which spirals downwardly along the path 16. The inner surfaces 10a and 10b of said bowl are shaped in a predetermined manner to create a whirlpool effect which provides a vacuum at the central zone of the flow which tends to draw not only the molten metal thereinto but also any particulate matter which is dropped onto the upper regions of said vortical flow. The usual pyrotechniques, fume and metal splashing, normally accompanying the introduction of highly reactive nodulizers, such as magnesium, is eliminated or significantly reduced; this is probably due, in part, to dissolution occurring in the absence of air and, in part, due to the generally controlled flow of the molten metal in a vortical pattern which tends to knead and fold the treating agent substantially into and below the surface of the molten metal very quickly. This renders a very controlled solution rate and leads to a highly uniform and homogenized nodulized cast metal.

The mixing conduit C is characterized by an inlet portion 17 which is curved and is capable of gradually bringing the flow of molten metal from a vertical drop to a generally horizontal direction (making only an angle of about 10° with a horizontal plane) without turbulence and thus avoiding undue back pressure for the vortex flow. The conduit C is arranged with part 17a in the insulated housing 18 of the bowl and part 17b in an extension tube 19. Flow exits from conduit C by way of spout 21 which may again direct the treated molten metal flow downwardly or vertically. An offset 20 is provided in part 17b of the conduit to effect a choke or restriction for said flow. Such choke is arranged and designed to effect a controlled dwell time of the vortical flow within said funnel thereby effecting greater homogenization for said treating agent within said vortex flow if the application so requires. The sizing and dimensioning of said choke should effect a minimum reduction in the molten metal flow rate while insuring that complete dissolution of the magnesium alloy occurs in the stream treatment system.

A continuous supply of particulate treating agent D is introduced through an opening in the cover 12 and distributed or dropped onto a predetermined upper segment of the vortical flow. This invention is useful in connection with the treating of any molten metal which requires some metallurgical treatment, however, it is preferably employed to produce nodular iron from molten iron which would contain graphite in a flake form, if cast, prior to treatment according to normal foundry conditions which include inoculation. The treating agent is typically an alloy of magnesium, such as magnesium ferrosilicon. The treating agents may also be other alloys or compounds of magnesium, calcium, sodium, lithium, and rare earth metals. The nodulizing agent is used broadly in any form such as lumps, crushed aggregate, powders or even in an extruded rod-like form progressively introduced into the vortical flow. However, it has been found through experimentation that optimum results are obtained by using a semi-powder particulate form wherein each particle is no greater in size than 1400 microns and no less in size than 100 microns. The tube 25 for feeding the treating agent must be critically positioned to introduce the agent onto a location of the vortex flow where it will be optimally folded or kneaded into the molten iron.

Figure 2:
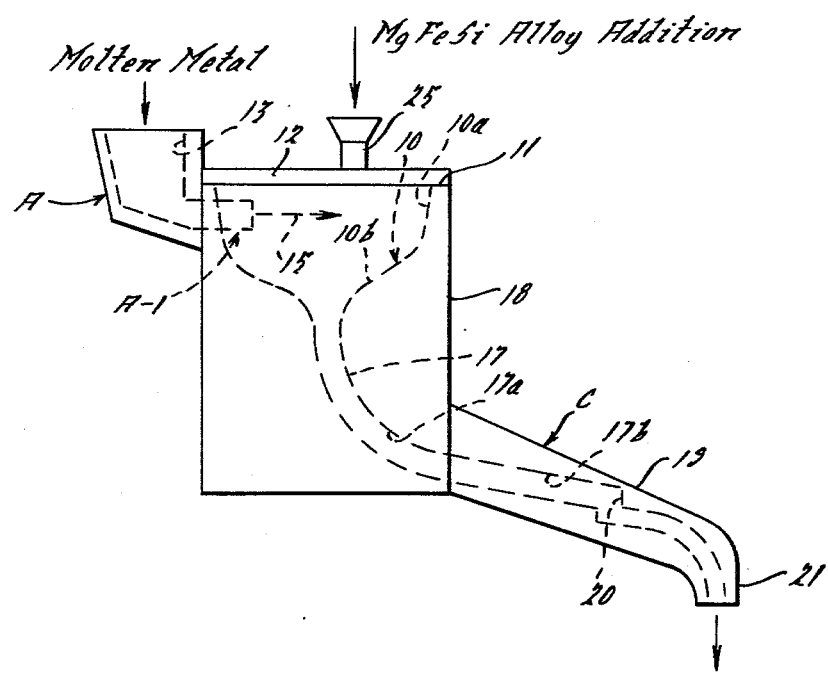
FIG. 2 is a side elevational view of the schematic treating apparatus of FIG. 1, again showing the sequence of treatment.

A preferred method utilizing the device of FIGS. 1 and 2, is as follows:

1. A vortical flow of molten treatable iron is formed, the molten iron is caused to enter the vortex 16 at the upper outer peripheral zone 23 thereof and exit from said vortical flow at the lower inner zone 24 thereof.

2. A predetermined and continuously graduated supply of treating agent D is introduced into the upper outer peripheral zone 23 of said vortical flow at a predetermined rate, such as 0.007-0.01 lbs. of treating agent for each lb. of molten metal flowing through said vortex.

3. The vortical flow is maintained in a closed chamber except for the entrance and exit thereof, said entrance and exit being closed by said flow and/or treating agent.

The following examples serve to illustrate the ability of the inventive process herein to achieve increased homogenization and more effective control of solution rate.

EXAMPLE 1

A molten iron metal charge of 52 lbs. was slowly and continuously added into the pouring cup; the cup was kept uniformly full during the pour (at most 1½" from top). The metal charge was comprised of 42 lbs. of pig iron, 7 lbs. of armco iron (very low carbon), 500 grams of ferrosilicon, and 160 grams of ferromanganese. The pouring temperature was 2550° F. The treating agent was added by a vibrator feed and was comprised of 300 grams of magnesium ferrosilicon (5% of the agent was Mg. and ⅜% was Cerium). The aggregate was controlled to 2840 mesh. The tube 25 for feeding the agent was stationed 90° from the immediate outlet of the stream forming conduit A-1 and about ⅓-½ the way down the bowl from its upper periphery; the mixing conduit was arranged as an elbow (radius of about 6-10") within the bowl housing. The nodularity of the cast metal was about 30%; no residue observed in the bowl after treatment; there was undue reaction at outlet of elbow.

EXAMPLE 2

The same procedure and starting materials were employed as in Example 1, except that the pouring temperature was 2600° F. The treating agent was comprised of 300 grams of magnesium ferrosilicon (5% Mg., ⅜% Cerium) and an additional amount of inoculant as 100 grams of ferrosilicon (75% Fe). The nodularity of the cast metal was about 95%, which represents very good treating reaction; again there occured reaction at the outlet of the elbow; no residue in the bowl.

EXAMPLE 3

Using the same procedure as Example 1, a 52 lb. molten iron charge, consisting of 46 lbs. of pig iron, 4 lbs. of armco iron, 600 grams of ferrosilicon (75% Fe), and 160 grams of ferromanganese was treated. The pouring temperature was 2500° F. The treating agent was comprised of 300 grams of magnesium ferrosilicon (6% Mg.) and 100 grams of ferrosilicon (75% Fe). The outlet of the system was modified to incorporate a 1" offset 20 in the conduit 19 or elbow at the horizontal section. Burning of unreacted magnesium occured at the outlet 21. The nodularity of the cast metal was 99% and no residue was apparent in the treating bowl. The reaction at the outlet 21 is attributed to the dimensioning of the offset.

EXAMPLE 4

The same procedure and starting materials were used as in Example 3. The treating agent was comprised of 300 grams of magnesium ferrosilicon (6% Mg.), an additional inoculant in the form of 100 grams of ferrosilicon (75% Fe), and 3 grams of cerium silicide all sized at 1410 microns. A ¾" offset 20 was used in conduit 19. All of the treating agent reacted in the system with no burning of magnesium occuring at the outlet 21. There was no residue in the bottom of the bowl B. The nodularity of the cast metal was about 98%. About 70 grams of the treating agent was not used. The smaller choke eliminates any air gap in outlet tube or elbow (which may occur in the upper interior zone of the horizontal sections of the outlet tube and thus may contribute to the greater effectiveness of achieving high nodularity with less treating agent (here effectively 330 grams).

Thus we were able to achieve complete conversion of the graphite form from flake to perfect spheroidal graphite with as little as 0.75–1.00% of the nodulizer alloy used in accordance with the present method. With any of the conventional stream treating techniques previously employed by the art, it would have been necessary to use at least 1.0% of the same treating agent. With the present method, a pour flow rate of 12–18 lbs./sec. can be maintained.

We claim:
1. A method of producing a treated iron, comprising:
   (a) forming a vortical flow of molten treatable grey iron, said molten iron entering said vortical flow at an outer peripheral zone thereof and exiting from said vortical flow at an inner zone thereof, said vortical flow being maintained at a rate of at least 12 lbs./sec.,
   (b) introducing a predetermined and continuously graduated supply of metal treating agent into the outer upper peripheral zone of said vortical flow, said treating agent containing an effective amount of magnesium to nodulize said treatable iron, and
   (c) maintaining said vortical flow in a closed chamber except for said entrance and exit, said entrance and exit being closed by said flow.

2. The method as in claim 1, in which flow downstream from said inner zone is constricted, said constriction increasing the dwell time of said molten metal in said vortical flow.

3. The method as in claim 1, in which said treatable iron consists essentially of cast iron having carbon in a form that would be flake-like, if cast, said treating agent consisting essentially of magnesium ferrosilicon with the magnesium constituting at least 5% of the iron charge.

4. A method of producing a treated iron, comprising:
   (a) forming a vortical flow of molten treatable grey iron, said molten iron entering said vortical flow at an outer peripheral zone thereof and exiting from said vortical flow at an inner zone thereof, said molten metal is maintained at a flow rate of 12–19 lbs./sec. in said vortex,
   (b) introducing a predetermined and continuously graduated supply of metal treating agent into the outer upper peripheral zone of said vortical flow, said treating agent containing an effective amount of magnesium to nodulize said treatable iron, and
   (c) maintaining said vortical flow in a closed chamber except for said entrance and exit, said entrance and exit being closed by said flow.

* * * * *